E. J. McDONNELL, Jr.
THERMOSTATIC DEVICE FOR DETERMINING THE TEMPERATURE OF HEATED SURFACES.
APPLICATION FILED FEB. 17, 1910.
1,062,348.
Patented May 20, 1913.
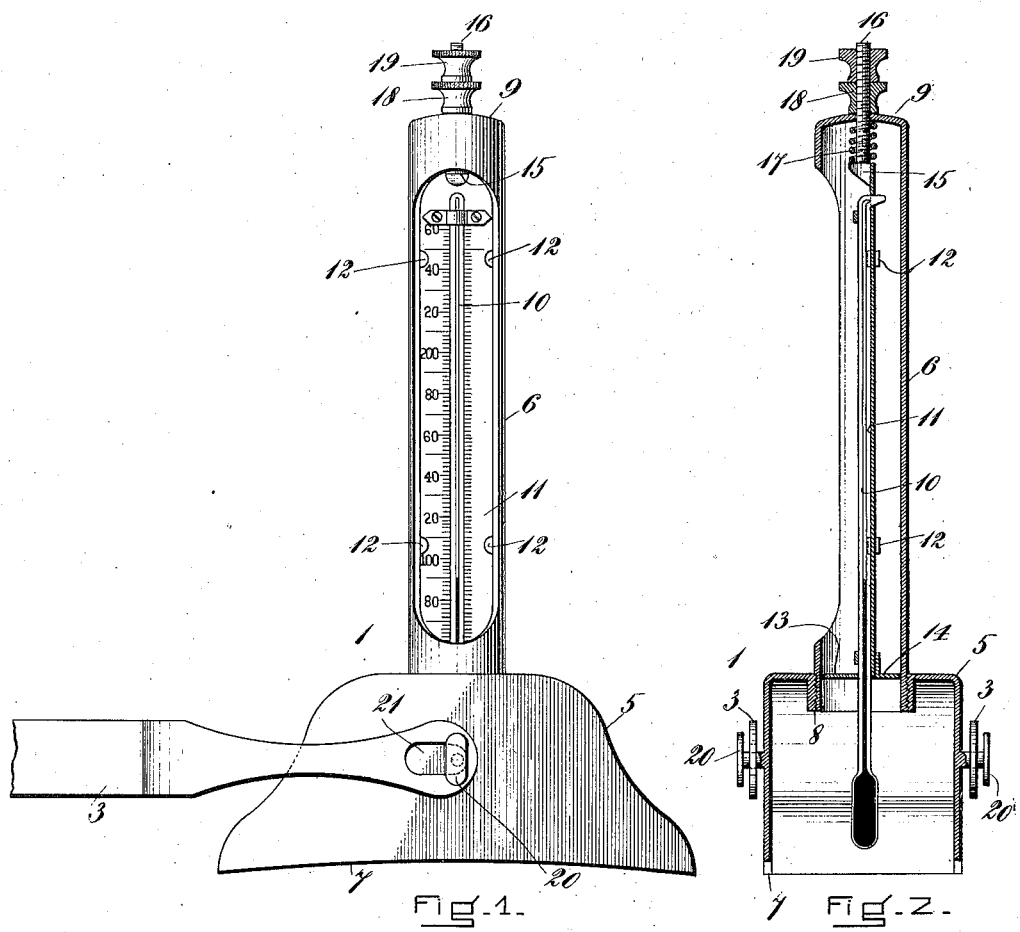

UNITED STATES PATENT OFFICE.

EDWARD J. McDONNELL, JR., OF BOSTON, MASSACHUSETTS.

THERMOSTATIC DEVICE FOR DETERMINING THE TEMPERATURE OF HEATED SURFACES.

1,062,348.  Specification of Letters Patent.  Patented May 20, 1913.

Application filed February 17, 1910. Serial No. 544,488.

*To all whom it may concern:*

Be it known that I, EDWARD J. McDON-NELL, Jr., of Boston, in the county of Suffolk and State of Massachusetts, a citizen of the United States, have invented a new and useful Improvement in Thermostatic Devices for Determining the Temperature of Heated Surfaces, of which the following is a full, clear, and exact description, reference being had to the accompanying drawings, forming a part of this specification, in explaining its nature.

My invention relates to a device of the above character essentially adapted to be used for determining the temperature of the surface of drying rolls or the like and especially steam heated rolls for drying or calendering paper.

The essential object of my invention is to provide a simple means or device whereby the temperature of heated surfaces or rolls may be easily and accurately determined.

The means or device comprising my invention may best be seen and understood by reference to the drawings, in which—

Figure 1 shows the device in side elevation. Fig. 2 shows the same in vertical section. Fig. 3 shows the device supported from a suitable fixture and applied to the surface of a roll, a part of which only is shown, the various parts being shown in side elevation.

Referring to the drawings:—1 represents the device comprising my invention.

2 represents a portion of a cylinder or roll to which the device is applied for ascertaining the temperature of the roll.

3 represents an arm or arms supporting the device on the roll, and 4 represents a frame or fixture to which the arm or arms 3 are secured.

The device 1 is constructed as follows: The exterior of the device comprises a casing or rather a combination of casings 5 and 6, the same preferably being made of sheet metal. Of these casings the primary casing or part 5 is a box-like or inclosing structure having preferably an open bottom. This casing is applied directly to the surface of the roll or heated object when the casing and portion of the roll covered by it act to form an inclosure or hot air chamber just adjacent to the portion of the roll covered by the casing. In this connection it is to be observed that the casing fits snugly upon the surface of the roll, the bottom edge portion 7 of the casing being made to conform thereto.

At about the center of the top wall or shell of the casing 5 an opening is formed and the secondary casing or part 6 is preferably made a detachable part, being secured to the casing 5 by a threaded connection 8. The casing 6 is preferably tubular in form, the top end 9 thereof being closed. On one side this casing is open for some considerable distance or so far that observation may be taken of the readings of a thermometer 10 located within it.

The thermometer 10 is arranged upon and supported by a backing 11. This backing is preferably about the width of the interior of the secondary casing and is inserted within this casing through the bottom end thereof. During such insertion of the backing carrying the thermometer its proper location within the casing is determined by means of guides or flanges 12 between which the backing slides and which flanges act also to retain the thermometer when in place as against rotary displacement.

The thermometer, arranged upon and supported by the backing, is of such length that when the backing is in place the bulb of the thermometer will extend down to a point near the bottom of the casing 5 and lie in close proximity to the heated surface or roll upon the application of the casing thereto. In this connection it is to be observed that the backing of the thermometer is provided at its lower end with forward and rear extending parts 13, 14, respectively. These parts when the backing is applied to the secondary casing are adapted to close the opening in the primary casing around the thermometer which extends through the opening.

For the purpose of holding the thermometer in place when located as aforesaid and also for adjustably supporting it in order that its bulb may be adjustably brought into close proximity to the heated surface or roll 2 there is provided the following mode of retention: At the point of the top end of the backing 11, supporting the thermometer, there is provided a shoulder 15. Secured to this shoulder is a screw or threaded member 16 which extends upwardly through the top end portion 9 of the casing 6. Arranged upon this screw between the shoulder 15 and the portion 9 of the secondary casing is a spring 17. Upon the screw 16 outside the secondary casing and bearing against the top end thereof is arranged an adjusting nut 18 above which, arranged upon the same screw, is a locking nut 19.

As already indicated the device 1 is supported or held in place upon the heated surface or roll 2 by means of an arm or arms 3 secured to any suitable fixture 4 lying adjacent to the heated surface or roll. These arms (there being preferably two arms) connect with the casing 5 in any suitable manner. A convenient method consists as shown in forming on opposite sides of this casing buttons 20 over which the arms are adapted to slip by slots 21 therein when the device is turned to a proper angular position which is a position different from the operative position of the device when applied to the roll. I prefer also that the arms 3 be movable arms by which the device may be swung onto or off the heated surface or roll as occasion may require. For this purpose each of the arms 3 is provided with a hinge 22.

The operation of using the device is by throwing it onto the roll 2 for the casing 5 to properly coöperate therewith. This of course may be done when the roll is in motion. Then by loosening the locking nut 19 and by unscrewing the adjusting nut 18 the spring 17 will tend by its extension as the adjusting nut is loosened, to press the backing 11 and thermometer carried by it downwardly and move the bulb of the thermometer into close proximity to the heated surface or roll. This adjustment may be accomplished with considerable nicety. I prefer to bring the bulb of the thermometer into a position about $\frac{1}{32}$ of an inch removed from the surface of the roll. When in this position I have found that the temperature of the roll may be quite accurately determined, the reading of the thermometer varying only about two degrees from the actual temperature of the roll which factor of error is kept in mind in the determination of a reading.

The utility of my device resides also in the fact that the bulb of the thermometer is protected from outside atmospheric influences by the casing, the air within the casing being in direct contact with the heated surface of the roll so that it will have substantially the same temperature as the roll. In this connection it will be observed that the air within the casing 5 is prevented from escaping too freely from inside this casing through the opening in it by the parts 13, 14, secured to the backing of the thermometer, which parts close said opening as before described thereby making the chamber of the casing 5 a substantially airtight chamber.

Having thus fully described my invention, I claim and desire to secure by Letters Patent of the United States:—

In a device of the character specified, the combination of a primary casing adapted to form a hot air chamber and having an opening in the top wall thereof, a secondary casing mounted upon said primary casing and connecting with said primary casing around the opening therein, said secondary casing having a closed bottom end and closed top end and a longitudinal opening along the side thereof, a thermometer and backing therefor located within said secondary casing and adjustable longitudinally therein, the said thermometer projecting downwardly through the bottom of said secondary casing into the chamber of said primary casing, a threaded member secured to the upper end of said backing and projecting upwardly through the head of said secondary casing, a spring located upon said threaded member and interposed between the end of said backing and the interior side of said head, and a nut upon the end of said threaded member bearing against said head on the outside thereof.

EDWARD J. McDONNELL, Jr.

Witnesses:
JOHN E. R. HAYES,
GEORGE LANGTON.